US011909879B2

(12) United States Patent
Xue et al.

(10) Patent No.: US 11,909,879 B2
(45) Date of Patent: Feb. 20, 2024

(54) SYSTEMS AND METHODS FOR GENERATING CUSTOMIZED NON-FUNGIBLE TOKENS

(71) Applicants: Yitian Xue, Upland, CA (US); Dapeng Ma, Irvine, CA (US)

(72) Inventors: Yitian Xue, Upland, CA (US); Dapeng Ma, Irvine, CA (US)

(*) Notice: Subject to any disclaimer, the term of this patent is extended or adjusted under 35 U.S.C. 154(b) by 208 days.

(21) Appl. No.: 17/324,860

(22) Filed: May 19, 2021

(65) Prior Publication Data

US 2022/0069996 A1   Mar. 3, 2022

Related U.S. Application Data

(60) Provisional application No. 63/186,085, filed on May 8, 2021.

(51) Int. Cl.
| | | |
|---|---|---|
| *H04L 29/06* | (2006.01) | |
| *H04L 9/32* | (2006.01) | |
| *H04L 9/08* | (2006.01) | |
| *H04L 9/00* | (2022.01) | |

(52) U.S. Cl.
CPC ............ *H04L 9/3213* (2013.01); *H04L 9/0866* (2013.01); *H04L 9/3239* (2013.01); *H04L 9/3263* (2013.01); *H04L 9/50* (2022.05); *H04L 2209/56* (2013.01)

(58) Field of Classification Search
CPC ... H04L 9/3213; H04L 9/0866; H04L 9/3239; H04L 9/3263; H04L 9/50; H04L 2209/56
See application file for complete search history.

(56) References Cited

U.S. PATENT DOCUMENTS

| | | | |
|---|---|---|---|
| 11,244,032 B1 * | 2/2022 | Nguyen | G06Q 20/1235 |
| 2022/0230175 A1 * | 7/2022 | Haruna | G06Q 20/065 |

* cited by examiner

*Primary Examiner* — Malcolm Cribbs
(74) *Attorney, Agent, or Firm* — Tatonetti IP

(57) ABSTRACT

The present disclosure discloses a customized non-fungible token (NFT) generation system used in entertainment industry. The system comprising: at least one processor; a database; a memory. The memory comprises a receiving module; an information encoder; a footage processor for processing the multimedia footage to obtain a non-fungible token (NFT) footage; a non-fungible token (NFT) content encoder for encoding the non-fungible token (NFT) customized multimedia content and the non-fungible token (NFT) footage to attain a non-fungible token (NFT) customized digital content; a non-fungible token (NFT) mint program for process a non-fungible token (NFT) metadata, the non-fungible token (NFT) supplement metadata and the non-fungible token (NFT) customized digital content to create a Customized non-fungible token (NFT). The system further comprises a communication network and a blockchain.

12 Claims, 4 Drawing Sheets

SYSTEMS AND METHODS FOR GENERATING CUSTOMIZED NON-FUNGIBLE TOKENS

CROSS-REFERENCE TO RELATED APPLICATION

This disclosure claims the benefit of the priority of U.S. Provisional Patent Application No. 63/186,085, entitled "Systems And Methods For Generating Customized Non-Fungible Tokens" and filed on May 8, 2021. The above-identified application is incorporated herein by reference in its entirety.

BACKGROUND

Field of Invention

The present disclosure is related to the field of distributed ledgers. More particularly, the present disclosure is related to generating customized non-fungible tokens (NFTs) that can be stored in distributed ledgers.

Description of Related Art

In a world dominated by the internet and technology, the fundamentals of conservative economics are changing dynamically with each passing year. One of the most revolutionary technologies that is changing the way humans perform economic transactions is blockchain technology. A blockchain is a growing list of records, called blocks, that are linked together using cryptography. Herein, each block contains a cryptographic hash of the previous block, a timestamp, and transaction data. The timestamp proves that the transaction data existed when the block was published in order to get into its hash. Blocks contain the hash of the previous block, forming a chain, with each additional block reinforcing the ones before it. Therefore, blockchains are resistant to modification of their data because once recorded, the data in any given block cannot be altered retroactively without altering all subsequent blocks.

Basically, the technology used by blockchain makes it nearly impossible for anyone to manipulate the data logged in it. This fundamental advantage of blockchain has generated a lot of interest among people all around the world to develop an alternative economy that is independent of the control of a central bank or a sovereign nation. The transparent nature of blockchain technology has been cited as an important reason for proposing their usage in economic transactions by means of cryptocurrencies such as Bitcoins.

An NFT is a unit of data stored on a digital ledger, called a blockchain, that certifies any digital file to be unique. An NFT functions like a cryptographic token, but unlike cryptocurrencies such as Bitcoin, are not mutually interchangeable, in other words, not fungible. NFTs are created when blockchains string records of cryptographic hash, a set of characters that verifies a set of data to be unique, onto previous records, therefore, creating a chain of identifiable data blocks. This cryptographic transaction process ensures the authentication of each digital file by providing a digital signature that is used to track NFT ownership. NFTs can be used to represent items such as photos, videos, audio, and other types of digital files. While copies of these digital items are available for anyone to obtain, NFTs are tracked on blockchains to provide the owner with proof of ownership that is separate from copyright.

There is a rising interest and demand for art items that are being sold as NFTs. Herein, an item (such as music, photo, drawing, video, and the like) may be sold by the owner as an NFT. They are similar to autographed copies of works. The unique identity and ownership of an NFT are verifiable via the blockchain ledger. NFTs have metadata that is processed through a cryptographic hash function. NFTs are getting a lot of attention from innovators across the world in recent times. Some patents relate to the generic functioning of NFTs are listed below.

US20210097508A1 discloses a method for creating a large number of non-fungible tokens on the Ethereum blockchain, wherein the method includes the steps of determining the number of tokens to create in a batch, minting a batch of non-fungible tokens by identifying a token identifier of the first token in the batch (the FROM value) and the last token in the batch (the TO value), emitting a single event for the creation of the batch of non-fungible tokens, and saving the event in an ownership database that is external to the blockchain in order to determine ownership of tokens in the Ethereum blockchain.

US20200242105A1 discloses a distributed computing platform and method for creating actionable digital assets and tokens incorporating influence and outreach ("KNFT"). A KNFT application server may be configured to receive, over a distributed computing network from a remote computing node, a request for a new non-fungible token wherein the KNFT comprises a unique KNFT identifier, at least one metadata element, and least one social vector. A blockchain proxy server may be operatively connected to the KNFT application server and to a distributed blockchain ledger. Social actions may comprise user comment, connection, direct message, like, or favorable rating, and a change in ownership of the KNFT may be written to the social vector by a KNFT API. The social vector may comprise social vector data from at least one prior owner, and the KNFT may further comprise a circulation trail vector that incorporates the ownership history of the KNFT.

WO2019213700A1 discloses a method for referencing frames of a film performed by a computer processor. The processor generates fungible tokens up to a total token supply on a blockchain. The processor then transfers one of the fungible tokens to a user and receives a request from a user for a frame of the film. In response, the processor generates a non-fungible token for the fungible token transferred to the user making the request, wherein generating the non-fungible token creates an association of the non-fungible token to a frame of the film. Finally, upon request by the user, the processor transfers the non-fungible token associated with the frame of the film on the blockchain.

While the prior arts relate to generating and tracking NFTs in general, they do not teach techniques for generating customized tokens using owner specific information to be used in entertainment industry. Most of the inventions relate to business application of NFTs and relate to buying selling of artistic work using NFTs. On the other hand, the present disclosure proposes a technical solution for generating customized NFTs in entertainment industry. The proposed invention provides systems and methods for generating customized NFTs using a novel technique.

SUMMARY

Embodiments in accordance with the present invention provide a customized non-fungible token (NFT) generation system used in entertainment industry. The system includes at least one processor and a database. The system also includes a memory communicatively coupled to the at least one processor and the database. The memory includes a receiving module configured to receive data representing selected parameters from, a digital copy of an owner's work, customization information, a multimedia footage, and/or a combination thereof. The memory further includes an information encoder configured to encode customization information to obtain a non-fungible token (NFT) customized multimedia content and a non-fungible token (NFT) supplement metadata. The customization information comprises non-fungible token (NFT) owner specified footage related information (owner information, copyright information, intellectual property information, change instruction of the original work, etc.), personal information (include name, signature, address, phone number, place of birth, etc.), and/or personal biometric information (include a height, a weight, a blood type, an eye color, a fingerprint, iris patterns, DNA information, etc.), and/or additional multimedia information (text, audio, still image, animation, video and interactivity, etc.) and/or combination thereof. The memory also includes a footage processor for processing the multimedia footage received by the receiving module to obtain a non-fungible token (NFT) footage. The multimedia footage is selected from the group comprising of a film/movie, a TV show, a photo, an audio, a drawing, a video, cast information, crew information, a plot detail, a review, a movie clip, a music footage, a still-image, an animation, film/movie trailers, show trailers and so forth. The memory further includes a non-fungible token (NFT) content encoder for encoding the non-fungible token (NFT) customized multimedia content and the non-fungible token (NFT) footage to attain a non-fungible token (NFT) customized digital content. The memory also includes a non-fungible token (NFT) mint program configured to process a non-fungible token (NFT) metadata, the non-fungible token (NFT) supplement metadata and the non-fungible token (NFT) customized digital content to create a customized non-fungible token (NFT). Further, the system comprises a communication network associated with the memory configured to receive and transmit the customized non-fungible token (NFT). The system also includes a blockchain with a public blockchain set up to store the customized non-fungible token (NFT) received over the communication network as a certificate of authenticity for a real object, a virtual object, or a combination thereof.

Embodiments in accordance with the present invention provide a system for generating customized non-fungible token (NFT). The system comprising at least one processor and a database. The system includes a memory, operatively connected with the at least one processor and the database, storing computer-executable instructions that, when executed by the at least one processor. The at least one processor is configured to receive data via a receiving module representing selected parameters from, a digital copy of an owner's work, customization information, a multimedia footage, and/or a combination thereof. The processor is configured to encode customization information received by the receiving module to obtain a non-fungible token (NFT) customized multimedia content and a non-fungible token (NFT) supplement metadata through an information encoder. The processor is configured to process the multimedia footage received by the receiving module to obtain a non-fungible token (NFT) footage by employing a footage processor. The processor is configured to encode the non-fungible token (NFT) customized multimedia content and the non-fungible token (NFT) footage to attain a non-fungible token (NFT) customized digital content using a non-fungible token (NFT) content encoder. Further, the processor is configured to process a non-fungible token (NFT) metadata, the non-fungible token (NFT) supplement metadata and the non-fungible token (NFT) customized digital content to create a customized non-fungible token (NFT) using a non-fungible token (NFT) mint program. The system further comprises a communication network associated with the memory configured to receive the customized non-fungible token (NFT). The system also includes a blockchain having a public blockchain configured to store the customized non-fungible token (NFT) received over the communication network.

Embodiments in accordance with the present invention provide a method for generating a customized non-fungible token (NFT) using a customized non-fungible token (NFT) generation system. The method comprising the step of connecting with at least one processor and a database for communicating with a memory. The method further comprising the step of receiving data via a receiving module representing selected parameters from, a digital copy of an owner's work, customization information, a multimedia footage, and/or a combination thereof. The method comprising the step of encoding customization information received by the receiving module to obtain a non-fungible token (NFT) customized multimedia content and a non-fungible token (NFT) supplement metadata through an information encoder. The method comprising the step of processing the multimedia footage received by the receiving module to obtain a non-fungible token (NFT) footage by employing a footage processor. The method further includes the step of encoding the non-fungible token (NFT) customized multimedia content and the non-fungible token (NFT) footage to attain a non-fungible token (NFT) customized digital content using a non-fungible token (NFT) content encoder. The method also includes the step of processing a non-fungible token (NFT) metadata, the non-fungible token (NFT) supplement metadata and the non-fungible token (NFT) customized digital content to create a customized non-fungible token (NFT) using a non-fungible token (NFT) mint program. The method comprising the step of receiving the customized non-fungible token (NFT) from the memory over a communication network. The method comprising the step of storing the customized non-fungible token (NFT) in a blockchain having a public blockchain as a certificate of authenticity for a real object, a virtual object, or a combination thereof.

Embodiments in accordance with the present invention provide a system for generating a customized non-fungible token (NFT) using the customized non-fungible token (NFT) generation system. The system comprising a multimedia footage processed by a footage processor to generate a non-fungible token (NFT) complaint footage. The multimedia footage represents a multimedia footage having parameters selected from the group comprising one of, a film/movie, a TV show, a photo, an audio, a drawing, a video, cast information, crew information, a plot detail, a review, a movie clip, a music footage, a still-image, an animation, film/movie trailers, show trailers and/or a combination thereof. The system further includes a customization information embedded with the NFT compliant footage stored in a memory. The customization information is one of, non-fungible token owner specified footage related information (owner information, copyright information, intellectual property information, change instruction of the original work, etc.), personal information (include name, signature, address, phone number, place of birth, etc.), and/or personal biometric information (include a height, a weight, a blood type, an eye color, a fingerprint, iris patterns, DNA information, etc.), and/or additional multimedia information (text, audio, still image, animation, video and interactivity, etc.) and/or combination thereof. The system also includes non-fungible token (NFT) mint program processes by logging the customization information embedded with the non-fungible token (NFT) compliant footage in a blockchain to generate a customized non-fungible token (NFT).

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1:
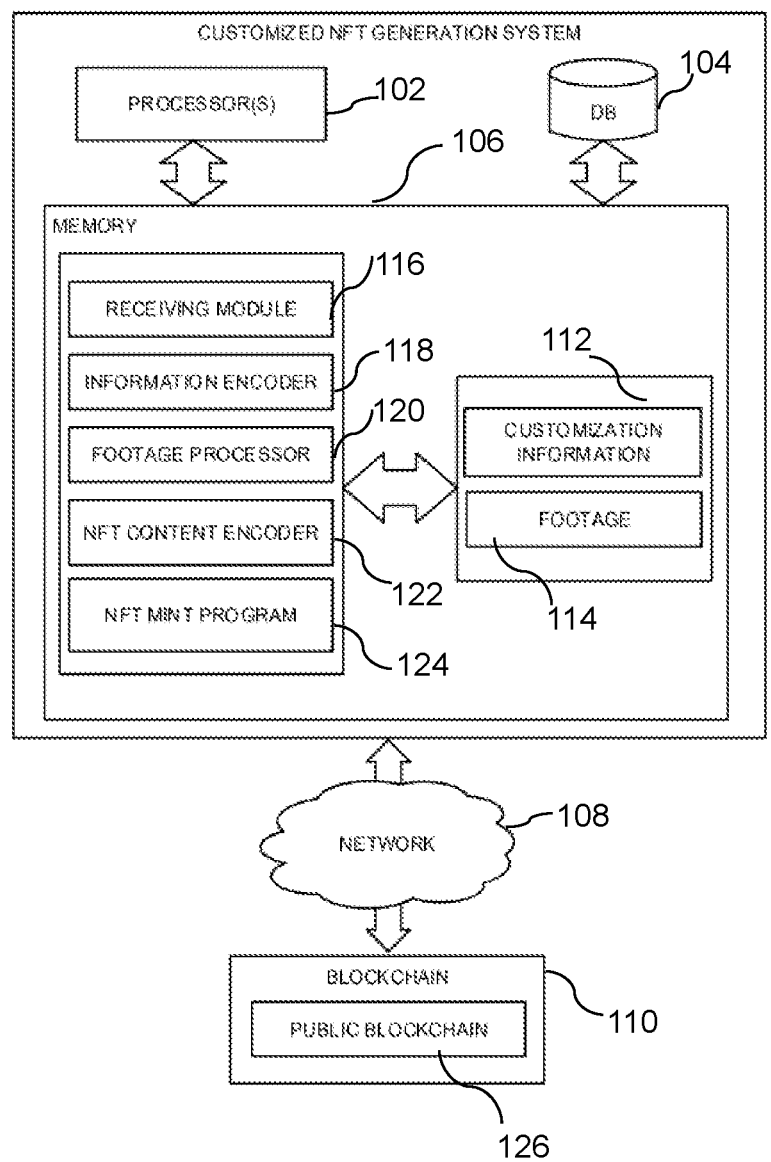
FIG. 1 illustrates an exemplary block diagram of an architecture of a Customized non-fungible token (NFT) generation system, according to embodiments of the present invention disclosed herein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The following description includes the preferred best mode of one embodiment of the present invention. It will be clear from this description of the invention that the invention is not limited to these illustrated embodiments, but the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In any embodiment described herein, the open-ended terms "comprising," "comprises," and the like (which are synonymous with "including," "having" and "characterized by") may be replaced by the respective partially closed phrases "consisting essentially of," "consists essentially of," and the like or the respective closed phrases "consisting of," "consists of, the like.

As used herein, the singular forms "a", "an", and "the" designate both the singular and the plural, unless expressly stated to designate the singular only.

FIG. 1 illustrates an exemplary block diagram of an architecture of a Customized non-fungible token (NFT) creation system 100, according to embodiments of the present invention. The Customized non-fungible token (NFT) creation system 100 comprises at least one processor 102, a database 104, a memory 106, a communication network 108, and a blockchain 110, according to embodiments of the present invention. Further, the memory 106, and the blockchain 110 may be connected through the communication network 108, according to embodiments of the present invention.

The communication network 108 may include a data network such as, but not limited to, an Internet, a Local Area Network (LAN), a Wide Area Network (WAN), a Metropolitan Area Network (MAN), etc. In some embodiments of the present invention, the communication network 108 may include a wireless network, such as, but not limited to, a cellular network and may employ various technologies including an Enhanced Data Rates for Global Evolution (EDGE), a General Packet Radio Service (GPRS), a Long Term Evolution (LTE), International Telecommunication Union International Mobile Telecommunications-2020 (ITU IMT-2020) and so forth. In some embodiments of the present invention, the communication network 108 may include or otherwise cover networks or sub-networks, each of which may include, for example, a wired or a wireless data pathway. According to an embodiment of the present invention, the at least one processor 102, the database 104, the memory 106 and the blockchain 110 may be configured to communicate with each other by one or more communication mediums connected to the communication network 108. The communication mediums include, but are not limited to, a coaxial cable, a copper wire, a fiber optic, a wire that comprise a system bus coupled to a processor of a computing device, and so forth. Embodiments of the present invention are intended to include or otherwise cover any type of the communication mediums, including known, related art, and/or later developed technologies.

According to an embodiment of the present invention, the at least one processor 102 may be configured to communicate with the memory 106 using the communication network 108. Further, the at least one processor 102 may be configured to receive and transmit data associated with the Customized non-fungible token (NFT) system 100, in an embodiment of the present invention. According to embodiments of the present invention, the at least one processor 104 may be, but not limited to, a Programmable Logic Control unit (PLC), a microcontroller, a microprocessor, a computing device, a development board, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits, and so forth. Embodiments of the present invention are intended to include or otherwise cover any type of the at least one processor 102 including known, related art, and/or later developed technologies that may be capable of processing the received data. The at least one processor 102 may also include the functionality to encode messages and/or data or information. The processor(s) 102 may include, among other things, a clock, an arithmetic logic unit (ALU), and logic gates configured to support the operation of processor(s). Further, the processor(s) 102 may include functionality to execute one or more software programs, which may be stored in the memory or otherwise accessible to processor(s) 102.

According to embodiments of the present invention, the database 104 of the Customized non-fungible token (NFT) generation system 100 may be capable of storage and retrieval of the data comprising a digital copy of an owner's work, Customization Information 112, a Multimedia Footage 114, and so forth, associated with the customized non-fungible token (NFT) system 100. According to embodiments of the present invention, the database 114 may be, but is not limited to, a centralized database, a distributed database, a personal database, an end-user database, a commercial database, a Structured Query Language (SQL) database, a Non-SQL database, an operational database, a relational database, a cloud database, an object-oriented database, a graph database, and so forth. Embodiments of the present invention are intended to include or otherwise cover any type of the database 104 including known, related art, and/or later developed technologies that may be capable of the data storage and retrieval.

According to embodiments of the present invention, the memory 106 may be configured for storage and retrieval of data associated with the Customized non-fungible token (NFT) generation system 100. In an embodiment of the present invention, the memory 106 may be configured to store data and computer executable instructions. The memory 106 may be communicatively coupled to the at least one processor 102 and the database 104. According to embodiments of the present invention, the data may be, such as, but not limited to, a digital copy of an owner's work, Customization Information 112, a Multimedia Footage 114, and so forth. Embodiments of the present invention are intended to include or otherwise cover any type of data including known, related art, and/or later developed technologies. According to embodiments of the present invention, the memory 106 may be, but is not limited to, a Static Random-Access Memory (SRAM), a Dynamic Random-Access Memory (DRAM), Programmable read-only memory (PROM), an Erasable Programmable read only memory (EPROM), an Electrically erasable programmable read only memory (EEPROM), a flash memory, and so forth. Embodiments of the present invention are intended to include or otherwise cover any type of the memory 106 including known, related art, and/or later developed technologies. Further, the memory comprises a receiving module 116, an information encoder 118, a footage processor 120, a non-fungible token (NFT) content encoder 122, a non-fungible token (NFT) Mint Program 124, and so forth.

According to embodiments of the present invention, the receiving module 116 may be configured to receive data representing selected parameters. According to embodiments of the present invention, the data representing parameters, such as, but not limited to, a digital copy of an owner's work, Customization Information 112, a Multimedia Footage 114, and/or a combination thereof. Embodiments of the present invention are intended to include or otherwise cover any type of data including known, related art, and/or later developed technologies.

According to embodiments of the present invention, the information encoder 118 may be configured to encode Customization Information 112 to obtain a non-fungible token (NFT) customized multimedia content 212 and a non-fungible token (NFT) supplement metadata 220. According to embodiments of the present invention, the Customization Information 112 may be, such as, but not limited to, non-fungible token owner specified footage related information (owner information, copyright information, intellectual property information, change instruction of the original work, etc.), personal information (include name, signature, address, phone number, place of birth, etc.), and/or personal biometric information (include a height, a weight, a blood type, an eye color, a fingerprint, iris patterns, DNA information, etc.) and/or additional multimedia information (text, audio, still image, animation, video and interactivity, etc.) and so forth. Embodiments of the present invention are intended to include or otherwise cover any type of the parameters including known, related art, and/or later developed technologies. In an embodiment of the present invention, the Customization Information 112 may be provided by an owner for encoding the non-fungible token (NFT) complaint footage 210. Herein, the Customization Information 112 may be a unique attribute related to the owner of the Customized non-fungible token (NFT). The Customization Information 112 may provide unique attributes to each non-fungible token (NFT) for making the Customized non-fungible token (NFT) irreplaceable.

According to embodiments of the present invention, the footage processor 120 may be configured to process the multimedia footage 114 received by the receiving module 116 to obtain a non-fungible complaint token (NFT) footage 210. According to embodiments of the present invention, the Multimedia Footage 114 may be such as, but not limited to, a film/movie, a TV show, a movie clip, a music footage, a still-image, an animation, film/movie trailers, show trailers and so forth. Embodiments of the present invention are intended to include or otherwise cover any type of the Multimedia Footage 114 including known, related art, and/or later developed technologies.

According to embodiments of the present invention, the non-fungible token (NFT) content encoder 122 may be configured to encode the non-fungible token (NFT) customized multimedia content 212 and the non-fungible token (NFT) complaint footage 210 to attain a non-fungible token (NFT) customized digital content 218.

According to embodiments of the present invention, the non-fungible token (NFT) Mint Program 124 may be configured to process a non-fungible token (NFT) metadata (218), the non-fungible token (NFT) supplement metadata (220) and the non-fungible token (NFT) customized digital content (218) to create a Customized non-fungible token (NFT) 224. According to embodiments of the present invention, the customized non-fungible token (NFT) 224 may be related to works such as but not limited to, music, television shows, sports programs, or any other artistic work related to the entertainment industry. Based on the information collected, the Customized non-fungible tokens (NFTs) may be used/but not limited to change/replace pixels of video frames, change/replace sound waves of audio, change/replace pixels of still-image, replace roles in movie clips with customized photos or videos, replace audio in music with customized voice input, modifying script based on user customized information 112, adding roles into a television show or movie based on user provided photos or videos, and the like. Furthermore, Customized non-fungible tokens (NFTs) 224 may be used to buy digital assets or prove the authenticity of ownership of a digital asset which is one of the main use cases of NFTs. Moreover, the Customized non-fungible tokens (NFTs) 224 generated may not only be unique but may also have traits of the owner since Customization Information 112 provided by the owner is used in generating the Customized non-fungible token (NFT) 224.

According to embodiments of the present invention, the communication network 108 may be associated with the memory 106 configured to receive and transmit the Customized non-fungible token (NFT) 224. In one implementation, the communication network 108 may be a wireless network, a wired network, or a combination thereof. The communication network 108 may be implemented as one of the several types of networks, such as intranet, local area network (LAN), wide area network (WAN), the internet, and the like. The communication network 108 may either be a dedicated network or a shared network. The shared network represents an association of the several types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network 108 may include a variety of network devices, including routers, bridges, servers, computing devices, storage devices, and the like.

According to embodiments of the present invention, the blockchain 110 comprises a public blockchain 126 set up to store the Customized non-fungible token (NFT) received over the communication network 108 as a certificate of authenticity for a real object, a virtual object, or a combination thereof. The virtual object is modified/altered based on the outcome of the Customized non-fungible token (NFT) 224 when computer-executable instructions stored in the memory 106 are executed through the at least one processor 104. Further, the blockchain 110 refers to a public distributed ledger that has absolutely no access restrictions. Anyone with an Internet connection can send transactions to it as well as become a validator (i.e., participate in the execution of a consensus protocol). The Customized non-fungible token (NFT) 224 generated by altering parameters, such as, but not limited to, change/replace pixels of video frames, change/replace sound waves of audio, change/replace pixels of still-image, replace people in the movie, add people into the movie, replace the sound, and so forth. Embodiments of the present invention are intended to include or otherwise cover any type of parameters for altering of the Customized non-fungible token (NFT) 224 including known, related art, and/or later developed technologies.

According to embodiments of the present invention, the blockchain 110 may be, such as but not limited to, a public blockchain, a private blockchain, a hybrid blockchain, a consortium block chain, and so forth. In one example, the present disclosure may be used along with a blockchain network such as but not limited to Ethereum, Flow, Tezos, WAX, EOS, TRON, IOST, Ontology, ThunderCore, VeChain, NEO, Steem, Hive, BORA, BSC, Polygon, NEAR and so forth. The use cases of the proposed invention may be very wide when it comes to the entertainment industry. Embodiments of the present invention are intended to include or otherwise cover any type of the blockchain 110 including known, related art, and/or later developed technologies.

Figure 2:
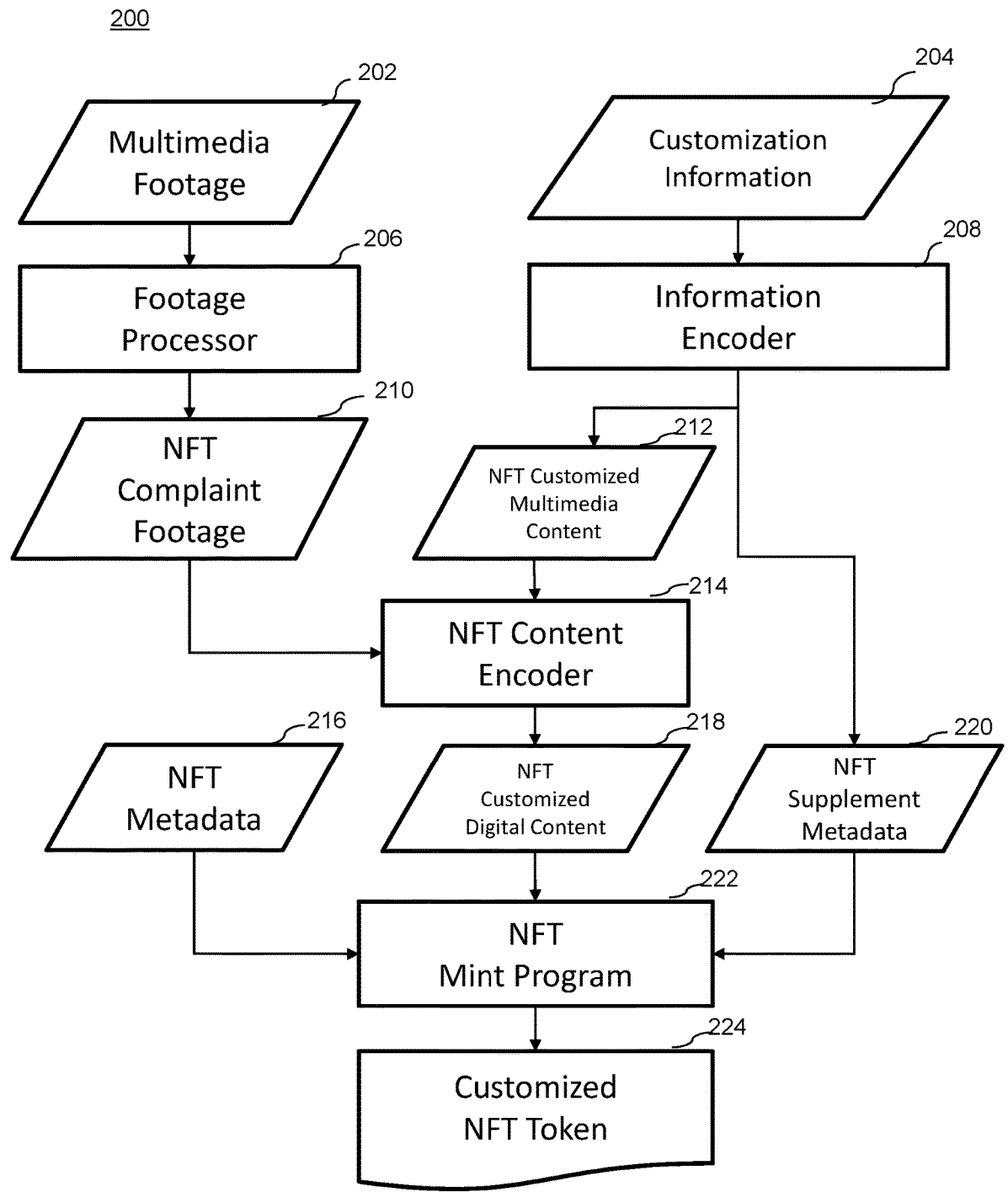
FIG. 2 illustrates a schematic flow diagram for a process of generating the Customized non-fungible token (NFT) using the customized non-fungible token (NFT) generation system, according to embodiments of the present invention disclosed herein.

FIG. 2 illustrates a schematic flow diagram for a process of generating the Customized non-fungible token (NFT) 224 using the Customized non-fungible token (NFT) generation system 200, according to embodiments of the present invention. The system 200 for generating customized non-fungible token (NFT) 224 comprises the at least one processor 102, the database 104, the memory 106, the communication network 108, the blockchain 110, and so forth. Further, the memory 106, and the blockchain 110 may be connected through the communication network 108, according to embodiments of the present invention.

According to embodiments of the present invention, the memory 106 may be operatively connected with the at least one processor 102 and the database 104 for storing computer-executable instructions that may be executed by the at least one processor 102. According to embodiments of the present invention, the memory 106 may be configured for storage and retrieval of data associated with the customized non-fungible token (NFT) generation system 100. In an embodiment of the present invention, the memory 106 may be configured to store data and computer executable instructions. According to embodiments of the present invention, the data may be, such as, but not limited to, a digital copy of an owner's work, Customization Information 204, a Multimedia Footage 202, and so forth. Embodiments of the present invention are intended to include or otherwise cover any type of data including known, related art, and/or later developed technologies.

According to embodiments of the present invention, the memory 106 may be, but is not limited to, a Static Random-Access Memory (SRAM), a Dynamic Random-Access Memory (DRAM), Programmable read-only memory (PROM), an Erasable Programmable read only memory (EPROM), an Electrically erasable programmable read only memory (EEPROM), a flash memory, and so forth. Embodiments of the present invention are intended to include or otherwise cover any type of the memory 106 including known, related art, and/or later developed technologies.

According to embodiments of the present invention, the at least one processor 102 may be configured to receive data via a receiving module 116 representing selected parameters from, a digital copy of an owner's work, Customization Information 204, a Multimedia Footage 202, and so forth. According to embodiments of the present invention, the Customization Information 204 may be, such as, but not limited to, non-fungible token owner specified footage related information (owner information, copyright information, intellectual property information, change instruction of the original work, etc.), personal information (include name, signature, address, phone number, place of birth, etc.), and/or personal biometric information (include a height, a weight, a blood type, an eye color, a fingerprint, iris patterns, DNA information, etc.) and/or additional multimedia information (text, audio, still image, animation, video and interactivity, etc.) and so forth. Embodiments of the present invention are intended to include or otherwise cover any type of the parameters including known, related art, and/or later developed technologies. According to embodiments of the present invention, the Multimedia Footage 202 may be such as, but not limited to, a film/movie, a TV show, a photo, an audio, a drawing, a video, cast information, crew information, a plot detail, a review, a movie clip, a music footage, a still-image, an animation, film/movie trailers, show trailers and so forth. Embodiments of the present invention are intended to include or otherwise cover any type of the Multimedia Footage 202 including known, related art, and/or later developed technologies.

The processor 102 may be further configured to encode Customization Information 204 received by the receiving module 116 to obtain a non-fungible token (NFT) Customized Multimedia Content 212 and a non-fungible token (NFT) Supplement Metadata 220 through an Information Encoder 208. The processor 102 may be further configured to process the Multimedia Footage 202 received by the receiving module 116 to obtain a non-fungible token (NFT) Complaint Footage 210 by employing a Footage Processor 206. The processor 102 may further be configured to encode the non-fungible token (NFT) Customized Multimedia Content 212 and the non-fungible token (NFT) Complaint Footage 210 to attain a non-fungible token (NFT) Customized Digital Content 218 using a non-fungible token (NFT) Content Encoder 214. The processor 102 may further be configured to process a non-fungible token (NFT) Metadata (216), the non-fungible token (NFT) Supplement Metadata 220 and the non-fungible token (NFT) Customized Digital Content 218 to create a Customized non-fungible token (NFT) 224 using a non-fungible token (NFT) Mint Program 222.

According to embodiments of the present invention, the communication network 108 may be associated with the memory 106 configured to receive the Customized non-fungible token (NFT) 224. The Customized non-fungible token (NFT) 224 received over the communication network 108 may be verified by the communication network 108. The verified Customized non-fungible token (NFT) 224 may be logged in the public blockchain (126) with a set of protocols for marking a permanent chain of custody on the Customized non-fungible token (NFT) 224 to restrict the swap of the verified Customized non-fungible token (NFT) 224 with fake.

According to embodiments of the present invention, the blockchain 110 comprises the public blockchain 126 that may be configured to store the Customized non-fungible token (NFT) 224 received over the communication network 108. The blockchain 110 with a public blockchain 126 may be configured to store the Customized non-fungible token (NFT) received over the communication network 108 as a certificate of authenticity for a real object, a virtual object, and so forth. The virtual object may be modified/swapped based on the outcome of the Customized non-fungible token (NFT) 224 when computer-executable instructions stored in the memory 106 are executed through the at least one processor 104. The Customized non-fungible token (NFT) 224 generated by altering parameters, such as, but not limited to, change/replace pixels of video frames, change/replace sound waves of audio, change/replace pixels of still-image, replace people in the movie, add people into the movie, replace the sound, and so forth. Embodiments of the present invention are intended to include or otherwise cover any type of parameters for altering of the Customized non-fungible token (NFT) 224 including known, related art, and/or later developed technologies.

Further, the FIG. 2 represents generalized illustrations, and that other processes maybe added, or existing processes may be removed, modified, or rearranged without departing from the scope and spirit of the present application. In addition, the processes may represent instructions stored on a computer-readable storage medium that, when executed, may cause a processor to respond, to perform actions, to change states, and/or to make decisions. Alternatively, the processes may represent functions and/or actions, to change states, and/or to make decisions. Alternatively, the processes may represent functions and/or actions performed by functionally equivalent circuits like analog circuits, digital signal processing circuits, application-specific integrated circuits (ASICs), or other hardware components associated with the system. Furthermore, the flow charts are not intended to limit the implementation of the present application, but rather the flowcharts illustrate functional information to design/fabricate circuits, generate programs, or use a combination of hardware and program to perform the illustrated processes.

Figure 3:
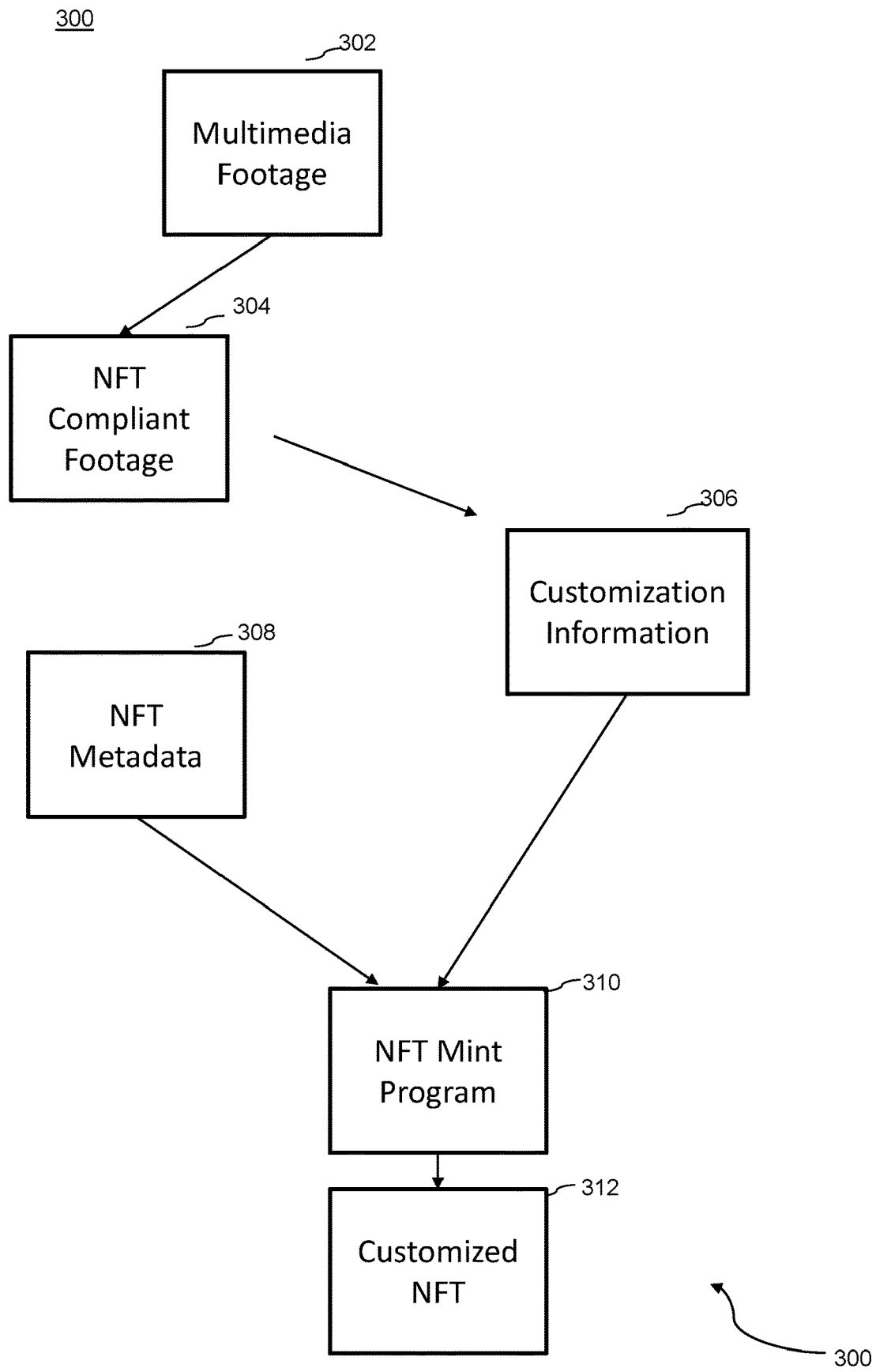
FIG. 3 illustrates a block diagram depicting the generation of the Customized non-fungible token (NFT) using the Customized non-fungible token (NFT) generation system, according to embodiments of the present invention disclosed herein.

FIG. 3 illustrates a block diagram depicting the generation of the Customized non-fungible token (NFT) 224 using the Customized non-fungible token (NFT) generation system 300, according to embodiments of the present invention. The customized non-fungible token (NFT) generation system 300 may comprise a Multimedia footage 302, a non-fungible token (NFT) Complaint Footage 304, a Customization Information 306, a non-fungible token (NFT) Metadata 308, a non-fungible token (NFT) Mint Program 310, a Customized non-fungible token (NFT) 312, and so forth.

According to an embodiment of the present invention, the Multimedia Footage 302 may be processed by the footage processor 120 to generate a non-fungible token (NFT) Complaint Footage 304. According to embodiments of the present invention, the Multimedia Footage 302 may be the footage having parameters such as, but not limited to, a film/movie, a TV show, a photo, an audio, a drawing, a video, cast information, crew information, a plot detail, a review, a movie clip, a music footage, a still-image, an animation, film/movie trailers, show trailers and so forth. Embodiments of the present invention are intended to include or otherwise cover any type of the parameters including known, related art, and/or later developed technologies.

According to an embodiment of the present invention, the Customization Information 306 may be embedded with the non-fungible token (NFT) Compliant Footage 304 that may be further stored in the memory 106. According to an embodiment of the present invention, the non-fungible token (NFT) Metadata 308 may be stored in the memory 106. According to embodiments of the present invention, the Customization Information 306 may be, such as, but not limited to, non-fungible token (NFT) owner specified footage related information (owner information, copyright information, intellectual property information, change instruction of the original work, etc.), personal information (include name, signature, address, phone number, place of birth, etc.), and/or personal biometric information (include a height, a weight, a blood type, an eye color, a fingerprint, iris patterns, DNA information, etc.), and/or additional multimedia information (text, audio, still image, animation, video and interactivity, etc.) and so forth. Embodiments of the present invention are intended to include or otherwise cover any type of the parameters including known, related art, and/or later developed technologies. The memory may include, such as, but not limited to, a volatile memory and/or a non-volatile memory. Examples of volatile memory may include, but are not limited to, a volatile random-access memory (RAM). The non-volatile memory may additionally or alternatively comprise an electrically erasable programmable read-only memory (EEPROM), flash memory, hard drive, and the like. Some examples of volatile memory include, but are not limited to, dynamic RAM, static RAM, and the like. Some examples of the non-volatile memory include, but are not limited to, hard disks, magnetic tapes, optical disks, programmable read-only memory, erasable programmable read-only memory, electrically erasable programmable read-only memory, flash memory, and the like. Memory 106 may be configured to store information, data, applications, instructions, or the like for enabling the system to carry out various functions in accordance with various example embodiments. Additionally, or alternatively, the memory may be configured to store instructions which when executed by processor(s) cause the customized NFT generation system to behave in a manner as described in various embodiments According to an embodiment of the present invention, the non-fungible token (NFT) Mint Program 310 may process by logging non-fungible token (NFT) Metadata 308 and the Customization Information 306 embedded with the non-fungible token (NFT) Compliant Footage 304 in the blockchain 110 to generate a Customized non-fungible token (NFT) 312. The Customized non-fungible token (NFT) 312 may be received over the communication network 108 and may be further verified by the communication network 108. Moreover, the verified Customized non-fungible token (NFT) 312 may be logged in the public blockchain 126 with a set of protocols for marking a permanent chain of custody on the Customized non-fungible token (NFT) 312 to restrict the swap of the verified Customized non-fungible token (NFT) 312 with fake.

According to an embodiment of the present invention, the blockchain 110 comprising the public blockchain 126 may be configured to store the Customized non-fungible token (NFT) 312 received over the communication network 108. The Customized non-fungible token (NFT) may serve as a certificate of authenticity for a real object, a virtual object, or a combination thereof. Further, the virtual object may be modified based on the outcome of the Customized non-fungible token (NFT) 312 when computer-executable instructions stored in the memory 106 are executed through the at least one processor 104. The Customized non-fungible token (NFT) 312 generated by altering parameters, such as, but not limited to, change/replace pixels of video frames, change/replace sound waves of audio, change/replace pixels of still-image, replace people in the movie, add people into the movie, replace the sound, and so forth. Embodiments of the present invention are intended to include or otherwise cover any type of parameters for altering of the Customized non-fungible token (NFT) 312 including known, related art, and/or later developed technologies. In an embodiment of the present invention, the memory 106 may be communicatively coupled to the at least one processor 102 and the database 104 for computing computer-executable instructions and storing data. According to embodiments of the present invention, the data may be, such as, but not limited to, a digital copy of an owner's work, a Multimedia Footage 302, Customization Information 306, a Non-Fungible Token (NFT) Metadata 308 and/or a combination thereof. Embodiments of the present invention are intended to include or otherwise cover any type of data including known, related art, and/or later developed technologies.

Figure 4:
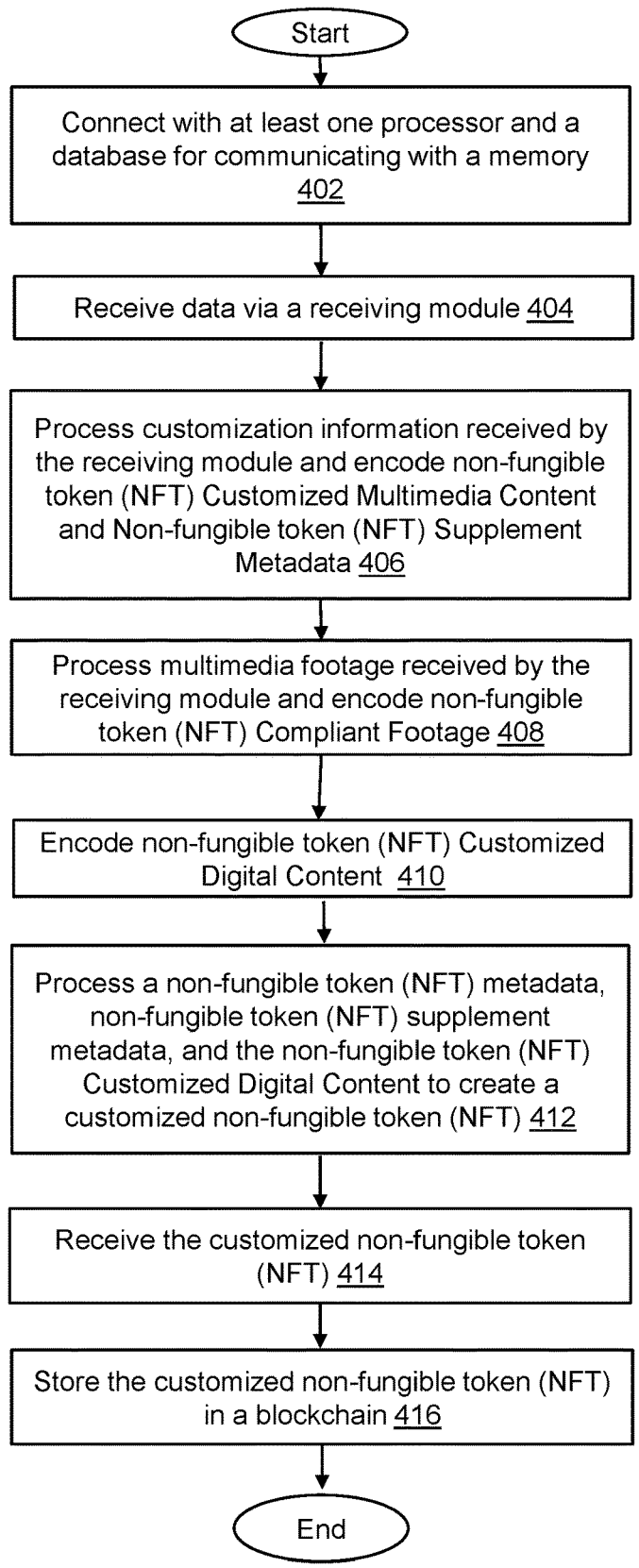
FIG. 4 illustrates a flowchart of a process for generating the Customized non-fungible token (NFT) using the Customized non-fungible token (NFT) generation system, according to embodiments of the present invention disclosed herein.

FIG. 4 illustrates a flowchart of a process 400 for generating the Customized non-fungible token (NFT) 224 using the Customized non-fungible token (NFT) generation system 100, according to embodiments of the present invention.

At step 402, the Customized non-fungible token (NFT) generation system 100 may connect with the at least one processor 102 and the database 104 for communicating with the memory 106.

At step 404, the Customized non-fungible token (NFT) generation system 100 may receive data via the receiving module 116 representing selected parameters. According to embodiments of the present invention, the parameters may be, such as, a digital copy of an owner's work, Customization Information 112, a Multimedia Footage 114, and so forth. Embodiments of the present invention are intended to include or otherwise cover any type of the parameters including known, related art, and/or later developed technologies.

At step 406, the Customized non-fungible token (NFT) generation system 100 may encode Customization Information 112 received by the receiving module 116 to obtain the NFT Customized Multimedia Content 212 and the NFT Supplement Metadata 220 through the information encoder 118. In an embodiment of the present invention, the Customization Information 112 received by the receiving module 116 may be processed by the information encoder 118.

At step 408, the Customized non-fungible token (NFT) generation system 100 may process the Multimedia Footage 114 received by the receiving module 116 to obtain the NFT Complaint Footage 210 by employing the footage processor 120. In an embodiment of the present invention, the non-fungible Complaint Footage 210 may be encoded.

At step 410, the Customized non-fungible token (NFT) generation system 100 may encoding the NFT Customized Multimedia Content 212 and the NFT Complaint Footage 210 to attain the NFT Customized Digital Content 218 using the NFT Content Encoder 122.

At step 412, the Customized non-fungible token (NFT) generation system 100 may process the NFT metadata 216, the NFT supplement metadata 220 and the NFT Customized Digital Content 218 to create the Customized NFT 224 using the NFT Mint Program 124.

At step 414, the Customized non-fungible token (NFT) generation system 100 may receive the Customized non-fungible token (NFT) 224 from the memory 106 over the communication network 108.

At step 416, the Customized non-fungible token (NFT) generation system 100 may store the Customized non-fungible token (NFT) 224 in the blockchain 110 having the public blockchain 126 as the certificate of authenticity for a real object, a virtual object, or a combination thereof. According to embodiments of the present invention, the blockchain 110 may be, such as but not limited to, a public blockchain, a private blockchain, a hybrid blockchain, a consortium block chain, and so forth. In one example, the present disclosure may be used along with a blockchain network such as but not limited to Ethereum, Flow, Tezos, and so forth. The use cases of the proposed invention may be very wide when it comes to the entertainment industry. Embodiments of the present invention are intended to include or otherwise cover any type of the blockchain 110 including known, related art, and/or later developed technologies.

Components of the Customized non-fungible token (NFT) generation system 100 may be any combination of hardware and programming to implement the functionalities described herein. In some implementations, the programming may be processor executable instructions stored on a non-transitory machine-readable storage medium (e.g., memory), and the hardware may include at least one processing resource to retrieve and/or execute those instructions.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing apparatus to produce machines, such that the instructions which execute on the computers or other programmable data processing apparatus create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements within substantial differences from the literal languages of the claims.

What is claimed is:

1. A system for generating Customized non-fungible token (NFT), the system comprising:
   at least one processor;
   a database;
   a memory, operatively connected with the at least one processor and the database, storing computer-executable instructions that, when executed by the at least one processor, wherein the at least one processor is configured to:
   receive data relating to a digital copy of an owner's work, wherein the data includes Multimedia Footage;
   process the Multimedia Footage, using a footage processor, to generate a NFT Compliant Footage, wherein the NFT Compliant Footage is embedded with Customization Information which includes owner-specific information including an owner's name and address;
   process, using a NFT Mint Program, NFT Metadata and the NFT Compliant Footage with its embedded Customization Information to generate a Customized NFT;
   transmit the generated Customized NFT to a blockchain;
   verify the Customized NFT over a communication network; and
   log, in the blockchain, a verified Customized NFT to restric the swap of the verified Customized NFT with a fake NFT.

2. The system as claimed in claim 1, wherein the owner-specific information in the Customization Information includes owner information, copyright information, intellectual property information, change instruction of the original work, personal information including name, signature, address, phone number, or place of birth, personal biometric information including height, weight, blood type, eye color, fingerprint, iris patterns, or DNA information, additional multimedia information including text, audio, still image, animation, or video and interactivity, or combination thereof.

3. The system as claimed in claim 1, wherein the Multimedia Footage is selected from the group comprising of a film/movie, a TV show, a photo, an audio, a drawing, a video, cast information, crew information, a plot detail, a review, a movie clip, a music footage, a still-image, an animation, film/movie trailers, show trailers and/or a combination thereof.

4. The system as claimed as claim 1, wherein the blockchain with a public blockchain is configured to store the Customized NFT received over the communication network as a certificate of authenticity for a real object, a virtual object, or a combination thereof.

5. The system as claimed as claim 4, wherein the virtual object is modified based on the outcome of the Customized NFT when computer-executable instructions stored in the memory are executed through the at least one processor.

6. A method for generating a Customized non-fungible token (NFT) using a Customized NFT generation system, the method comprising the steps of:
   connecting with at least one processor and a database for communicating with a memory;
   receiving data via a receiving module representing selected parameters from, a digital copy of an owner's work, Customization Information, a Multimedia Footage, and/or a combination thereof;
   encoding Customization Information received by the receiving module to obtain a NFT customized multimedia content and a NFT supplement metadata through an information encoder;
   processing the Multimedia Footage received by the receiving module to obtain a NFT footage by employing a footage processor;
   encoding the NFT customized multimedia content and the NFT footage to attain a customized digital content using a NFT content encoder;
   processing a NFT metadata, the NFT supplement metadata and the NFT customized digital content to create a Customized NFT using a NFT mint program,
   receiving the Customized NFT from the memory over a communication network;
   storing the Customized NFT in a blockchain having a public blockchain as a certificate of authenticity for a real object, a virtual object, or a combination thereof,
   verifying the Customized NFT over the communication network; and
   logging in the public blockchain, the verified customized NFT with a set of protocols for marking a permanent chain of custody on the Customized NFT to restrict the swap of the verified Customized NFT with a fake NFT.

7. The method as claimed in claim 6, further comprising the step of modifying the virtual object based on the outcome of the Customized NFT when executing computer-executable instructions stored in the memory through the at least one processor.

8. A computing device for customizing a NFT by embedding information, the computing device comprising:
  one or more processors including a footage processor,
  a Multimedia Footage, stored within a memory of the computing device, which is processed by the footage processor to generate a NFT compliant footage, wherein the Multimedia Footage includes any one or more of a film/movie, a TV show, a photo, an audio, a drawing, a video, cast information, crew information, a plot detail, a review, a movie clip, a music footage, a still-image, an animation, film/movie trailers, show trailers and/or a combination thereof;
  a Customization Information embedded with the NFT compliant footage stored in a memory, wherein the Customization Information includes owner information, copyright information, intellectual property information, change instruction of the original work, personal information including name, signature, address, phone number, or place of birth, personal biometric information including height, weight, blood type, eye color, fingerprint, iris patterns, or DNA information additional multimedia information including text, audio, still image, animation, or video and interactivity, or combination thereof;
  a NFT Mint Program processes which logs the Customization Information embedded with the NFT compliant footage in a blockchain to generate a customized NFT,
  wherein the Customized NFT received over the communication network is verified by the communication network, and
  wherein the verified Customized NFT is logged in a public blockchain with a set of protocols for making a permanent chain of custody on the Customized NFT to restrict the swap of the verified Customized NFT with fakes.

9. The computing device as claimed as claim 8, wherein the blockchain with a public blockchain is configured to store the Customized NFT received over the communication network as a certificate of authenticity for a real object, a virtual object, or a combination thereof.

10. The computing device as claimed as claim 9, wherein the virtual object is modified based on the outcome of the Customized NFT when computer-executable instructions stored in the memory are executed through the at least one processor.

11. The computing device as claimed in claim 8, wherein the memory is communicatively coupled to at least one processor and a database for computing computer-executable instructions and storing data.

12. The computing device as claimed in claim 8, wherein the data is selected from a group comprising one of, a digital copy of an owner's work, Customization Information, a Multimedia Footage, and/or a combination thereof.

* * * * *